United States Patent
Ovtcharov et al.

(10) Patent No.: US 11,604,960 B2
(45) Date of Patent: Mar. 14, 2023

(54) DIFFERENTIAL BIT WIDTH NEURAL ARCHITECTURE SEARCH

(71) Applicant: Microsoft Technology Licensing, LLC, Redmond, WA (US)

(72) Inventors: Kalin Ovtcharov, Snoqualmie, WA (US); Eric S. Chung, Redmond, WA (US); Vahideh Akhlaghi, Redmond, WA (US); Ritchie Zhao, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 700 days.

(21) Appl. No.: 16/356,928

(22) Filed: Mar. 18, 2019

(65) Prior Publication Data

US 2020/0302269 A1    Sep. 24, 2020

(51) Int. Cl.
*G06N 3/063* (2006.01)
*G06N 3/04* (2023.01)
*G06N 3/084* (2023.01)

(52) U.S. Cl.
CPC .......... *G06N 3/0445* (2013.01); *G06N 3/084* (2013.01)

(58) Field of Classification Search
CPC ..................................................... G06N 3/084
See application file for complete search history.

(56) References Cited

U.S. PATENT DOCUMENTS

2019/0042945 A1    2/2019   Majumdar et al.
2019/0050710 A1*   2/2019   Wang ................. G06N 3/08

OTHER PUBLICATIONS

Aswin Raghavan, Mohamed Amer, Sek Chai, & Graham Taylor. (2018). BitNet: Bit-Regularized Deep Neural Networks. (Year: 2018).*
Jungwook Choi, Zhuo Wang, Swagath Venkataramani, Pierce I-Jen Chuang, Vijayalakshmi Srinivasan, & Kailash Gopalakrishnan. (2018). PACT: Parameterized Clipping Activation for Quantized Neural Networks. (Year: 2018).*
Yoojin Choi, Mostafa El-Khamy, & Jungwon Lee. (2017). Towards the Limit of Network Quantization. (Year: 2017).*
Yi-Te Hsu, Yu-Chen Lin, Szu-Wei Fu, Yu Tsao, & Tei-Wei Kuo. (2018). A study on speech enhancement using exponent-only floating point quantized neural network (EOFP-QNN). (Year: 2018).*
Hirose K. et al. (2017) Quantization Error-Based Regularization in Neural Networks. In: Bramer M., Petridis M. (eds) Artificial Intelligence XXXIV. SGAI 2017. Lecture Notes in Computer Science, vol. 10630. Springer, Cham. https://doi.org/10.1007/978-3-319-71078-5_11 (Year: 2017).*

(Continued)

*Primary Examiner* — Kakali Chaki
*Assistant Examiner* — Johnathan R Germick
(74) *Attorney, Agent, or Firm* — Newport IP, LLC; Leonard J. Hope (57) ABSTRACT

Machine learning is utilized to learn an optimized quantization configuration for an artificial neural network (ANN). For example, an ANN can be utilized to learn an optimal bit width for quantizing weights for layers of the ANN. The ANN can also be utilized to learn an optimal bit width for quantizing activation values for the layers of the ANN. Once the bit widths have been learned, they can be utilized at inference time to improve the performance of the ANN by quantizing the weights and activation values of the layers of the ANN.

15 Claims, 8 Drawing Sheets

(56) References Cited

OTHER PUBLICATIONS

Drumond, et al., "End-to-End DNN Training with Block Floating Point Arithmetic", in Cornell University Library, Apr. 4, 2018, 9 Pages.
Liu, et al., "DARTS: Differentiable Architecture Search", in Journal of Computing Research Repository, Jun. 24, 2018, pp. 1-12.
Majumdar, et al., "Neural Architecture Search with Controller RNN", Retrieved from: https://github.com/titu1994/neural-architecture-search, Retrieved Date: Nov. 29, 2018, 3 Pages.
"International Search Report and Written Opinion issued in PCT Patent Application No. PCT/US20/021621", dated Jun. 15, 2020, 13 Pages.
Raghavan, et al., "Bit-Regularized Optimization of neural Nets", Retrieved From: https://openreview.net/forum?id=HJg1NTGZRZ, Nov. 16, 2018, 11 Pages.
Zoph, et al., "Neural Architecture Search with Reinforcement Learning", in Journal of Computing Research Repository, Nov. 5, 2016, 15 Pages.

\* cited by examiner

DIFFERENTIAL BIT WIDTH NEURAL ARCHITECTURE SEARCH

BACKGROUND

Artificial neural networks ("ANNs" or "NNs") are applied to a number of applications in Artificial Intelligence ("AI") and Machine Learning ("ML"), including image recognition, speech recognition, search engines, and other suitable applications. ANNs are typically trained across multiple "epochs." In each epoch, an ANN trains over all of the training data in a training data set in multiple steps. In each step, the ANN first makes a prediction for an instance of the training data (which might also be referred to herein as a "sample"). This step is commonly referred to as a "forward pass" (which might also be referred to herein as a "forward training pass").

To make a prediction, a training data sample is fed to the first layer of the ANN, which is commonly referred to as an "input layer." Each layer of the ANN then computes a function over its inputs, often using learned parameters, or "weights," to produce an input for the next layer. The output of the last layer, commonly referred to as the "output layer," is a class prediction, commonly implemented as a vector indicating the probabilities that the sample is a member of a number of classes. Based on the label predicted by the ANN and the actual label of each instance of training data, the output layer computes a "loss," or error function.

In a "backward pass" (which might also be referred to herein as a "backward training pass") of the ANN, each layer of the ANN computes the error for the previous layer and the gradients, or updates, to the weights of the layer that move the ANN's prediction toward the desired output. The result of training a ANN is a set of weights, or "kernels," that represent a transform function that can be applied to an input with the result being a classification, or semantically labeled output.

After an ANN is trained, the trained ANN can be used to classify new data. Specifically, a trained ANN model can use weights and biases computed during training to perform tasks (e.g. classification and recognition) on data other than that used to train the ANN. General purpose central processing units ("CPUs"), special purpose processors (e.g. graphics processing units ("GPUs"), tensor processing units ("TPUs") and field-programmable gate arrays ("FPGAs")), and other types of hardware can be used to execute an ANN model.

ANNs commonly use normal-precision floating-point formats (e.g. 16-bit, 32-bit, 64-bit, and 80-bit floating point formats) for internal computations. Performance, energy usage, and storage requirements of ANNs can, however, be improved through the use of quantized-precision floating-point formats during training and/or inference. Examples of quantized-precision floating-point formats include formats having a reduced bit width (including by reducing the number of bits used to represent a number's mantissa or exponent) and block floating-point ("BFP") formats that use a small (e.g. 3, 4, or 5-bit) mantissa and an exponent shared by two or more numbers. The use of quantized-precision floating-point formats can, however, have certain negative impacts on ANNs such as, but not limited to, a loss in accuracy.

It is with respect to these and other technical challenges that the disclosure made herein is presented.

SUMMARY

Technologies are disclosed herein for differential bit width neural architecture search. Through implementations of the disclosed technologies, the accuracy and/or inference time of ANNs that utilize quantized-precision floating-point formats can be improved by learning optimal bit widths for use in quantizing weights and activation values at inference time. The bit widths can be learned using an ANN, thereby reducing learning time as compared to network architecture search methods that use recurrent neural networks ("RNNs") and reinforcement learning. Reducing the time required to learn bit widths for quantizing weights and activation values can conserve computing resources such as, but not limited to, processor cycles, memory, network bandwidth, and power. Other technical benefits can be realized through implementations of the disclosed technologies.

In order to provide the technical benefits mentioned above, and potentially others, the disclosed technologies can learn optimized quantization parameters that define a quantization configuration for an ANN. For example, and without limitation, the quantization parameters can define a bit width for a mantissa for storing activation values generated by layers of an ANN. Quantization parameters might also, or alternately, define a bit width for a mantissa for storing weights for an ANN. The activation values and weights can be represented using a quantized-precision floating-point format, such as a BFP format having a mantissa that has fewer bits than a mantissa in a normal-precision floating-point representation and a shared exponent.

In order to learn the bit widths to be used for quantization, the bit widths are defined as trainable variables when training an ANN. At training time, a quantization function is utilized to quantize weights and activation values that is differential with respect to bit width. For example, during a forward training pass of a layer of the ANN, the quantizing function can be executed to quantize the weights for the layer of the ANN using according to a first bit width. The first bit width defines a bit width for a mantissa for storing the weights. The quantizing function can also be executed during training to quantize activation values for the layer of the ANN using a second bit width.

The value of a loss function can then be computed at the end of each forward training pass of the ANN. The computed value for the loss function can then be used during a backward training pass (i.e. backpropagation) to compute a gradient for the first bit width (i.e. the bit width used to quantize weights) and to compute a gradient for the second bit width (i.e. the bit width used to quantize activation values). New values for the first bit width and the second bit width can then be computed based upon the respective gradients. In some configurations, the quantizing function applies a floor function to round the new first bit width and the new second bit width down to an integer value and/or applies a weight decay to the new first bit width and the new second bit width. This training process can continue until training of the ANN is completed.

In some configurations, the bit widths for quantizing weights and activation values are learned after the weights for the ANN themselves have already been learned, which can also speed up learning of the bit widths. In other configurations, the bit widths for quantizing weights and activation values are learned at the same time as the weights for the ANN are being learned.

Following the process described above, the learned bit widths can be utilized to create and implement a quantized ANN. For example, and without limitation, the learned bit widths can be utilized at inference time to quantize weights and activation values of the ANN.

It should be noted that applications of the disclosed herein can be used with various types of neural networks, such as convolutional neural networks ("CNNs"), including implementations having Long Short-Term Memory ("LSTMs") or gated recurrent units ("GRUs"), or other suitable ANNs that can be adapted to use the technologies disclosed herein.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for differential bit width neural architecture search ("DBS"). In addition to other technical benefits, the disclosed technologies can reduce the amount of time required to learn optimal bit widths for quantizing weights and activation values as compared to network architecture search methods that use RNNs and reinforcement learning. Reducing the time required to learn bit widths for quantizing weights and activation values can conserve computing resources such as, but not limited to, processor cycles, memory, network bandwidth, and power. Other technical benefits not specifically identified herein can also be realized through implementations of the disclosed technologies.

Referring now to the drawings, in which like numerals represent like elements throughout the several FIGS., aspects of various technologies for differential bit width neural architecture search will be described. In the following detailed description, references are made to the accompanying drawings that form a part hereof, and which are shown by way of illustration specific configurations or examples.

Overview of ANNs and ANN Training

Figure 1:
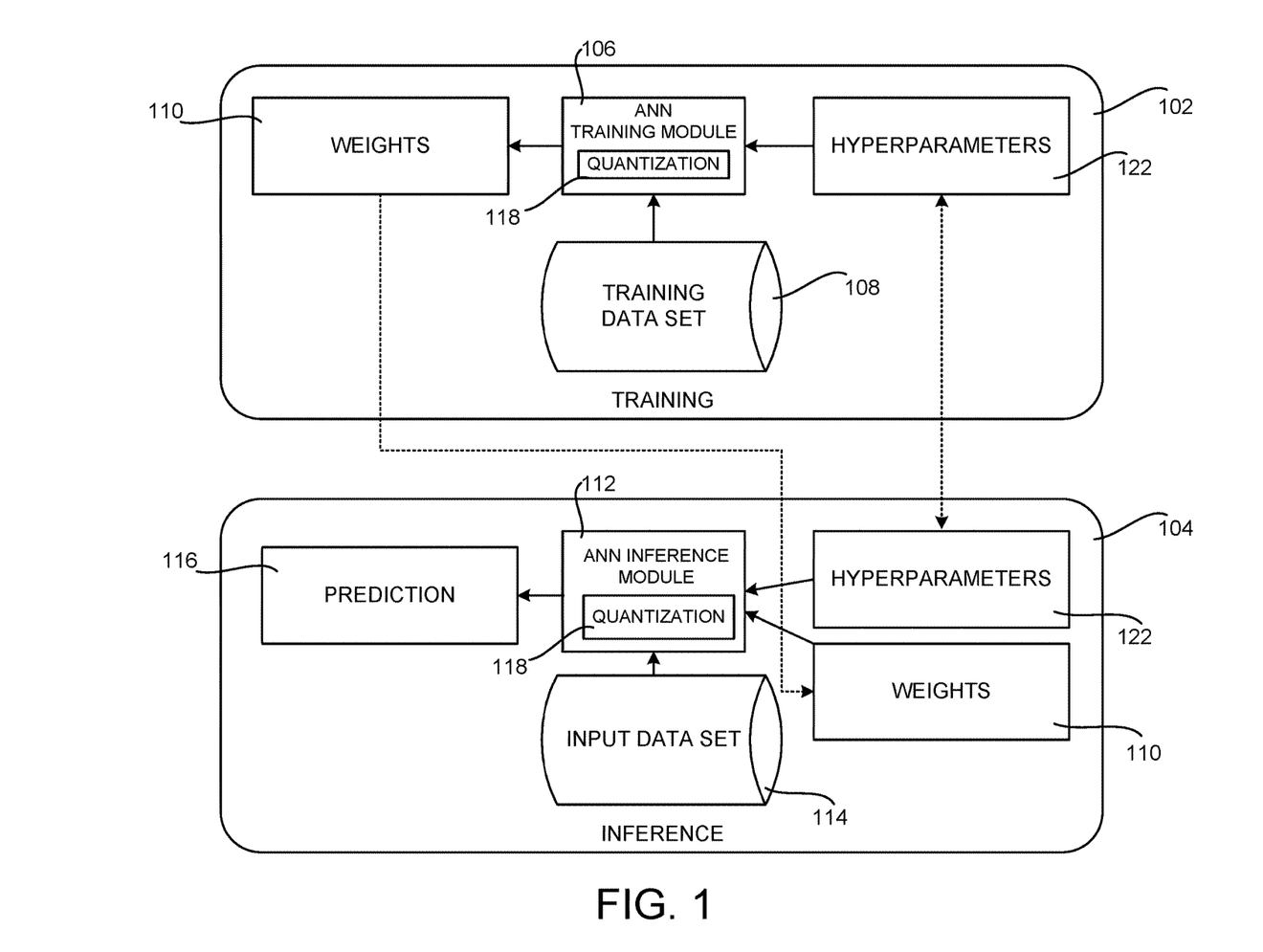
FIG. 1 is a computing architecture diagram that shows aspects of the configuration of a computing system disclosed herein that is capable of quantizing activations and weights during ANN training and inference, according to one embodiment disclosed herein.
Figure 2A:
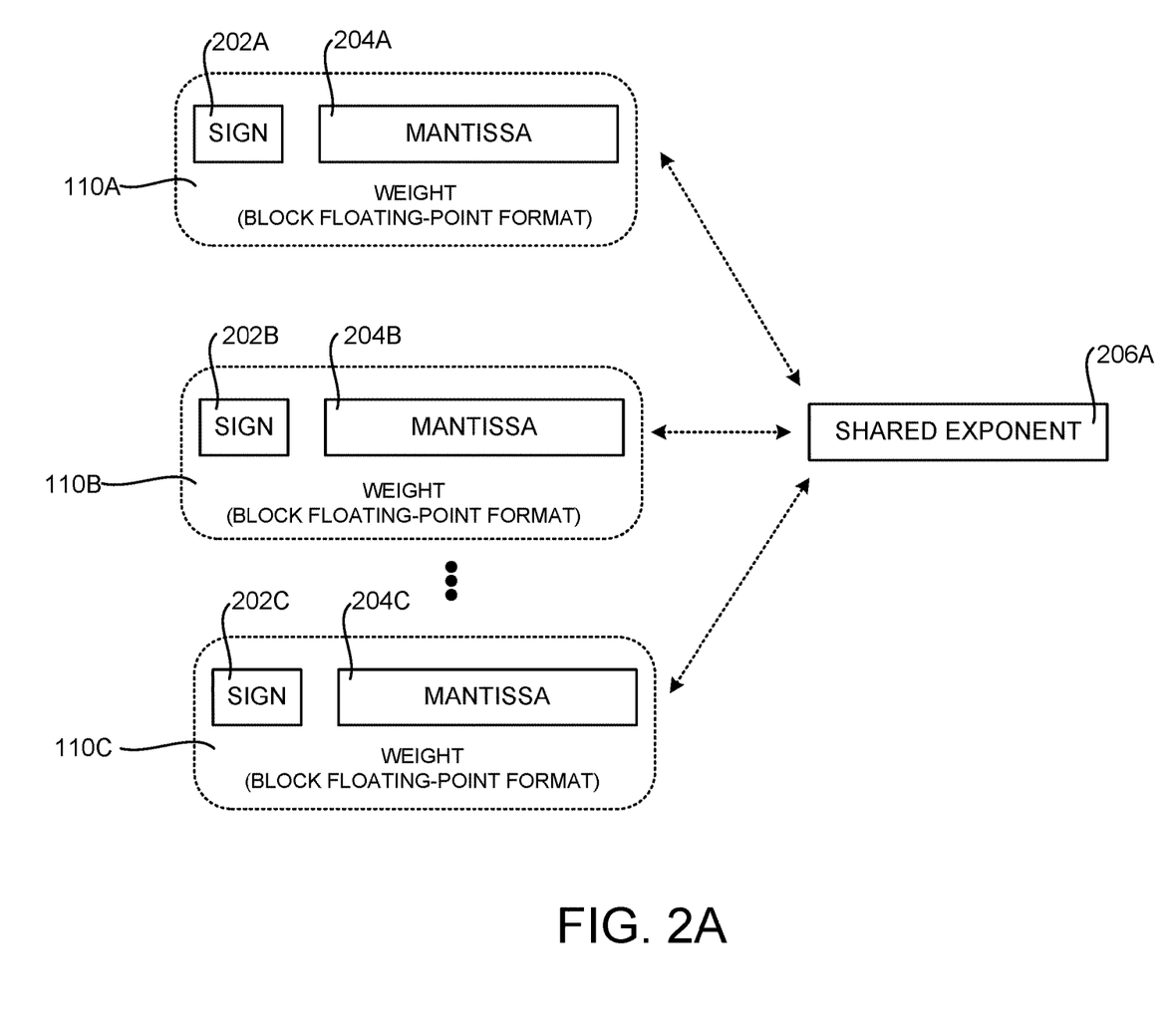
FIGS. 2A and 2B are data structure diagrams showing aspects of one mechanism for using a quantized-precision floating-point format to represent weights and activation values in an ANN, according to one embodiment disclosed herein.
Figure 2B:
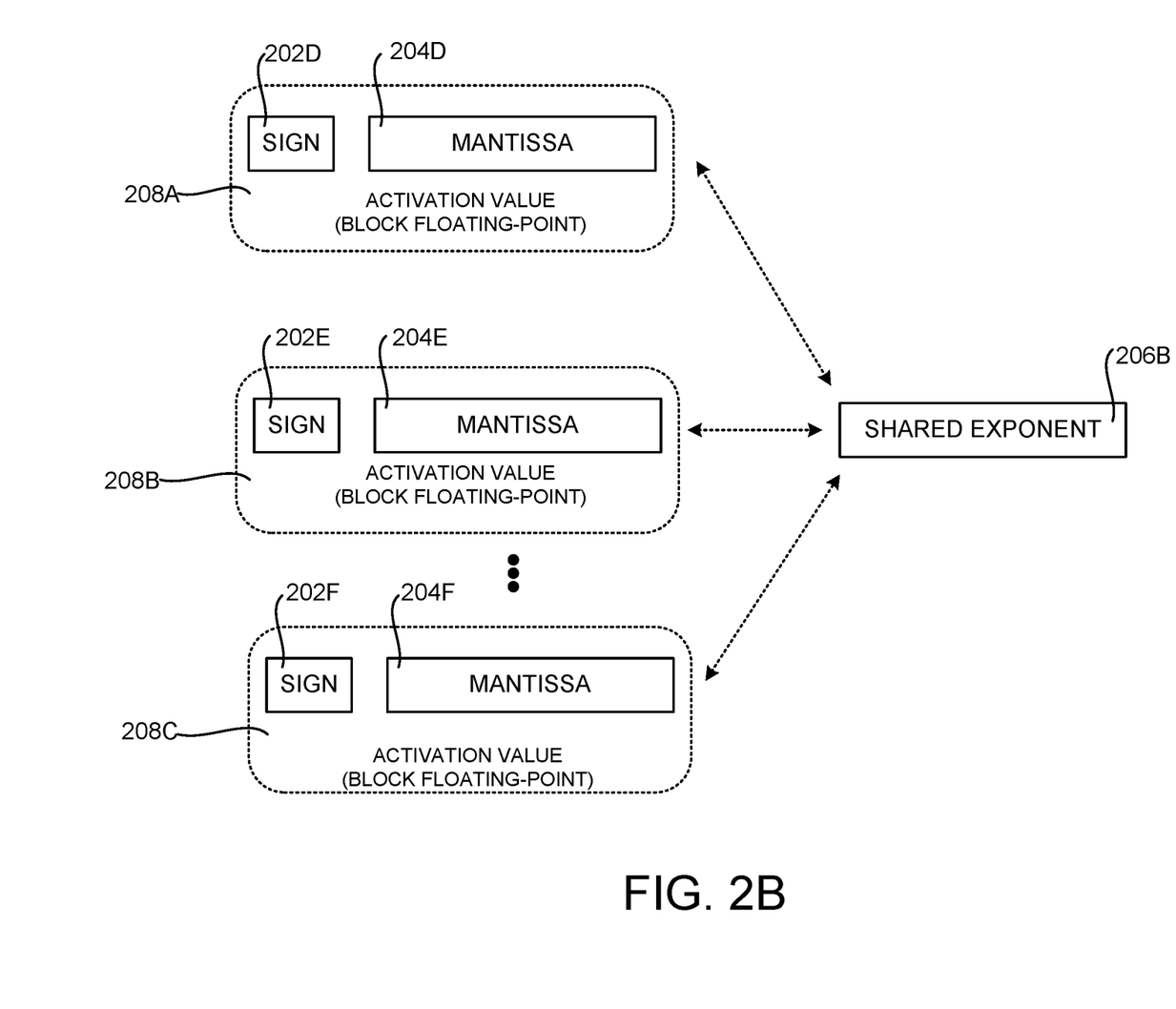

Prior to describing the disclosed technologies for differential bit width neural architecture search, a brief overview of ANNs, ANN training, and quantization will be provided with reference to FIGS. 1-2B. As described briefly above, ANNs are applied to a number of applications in AI and ML including, but not limited to, recognizing images or speech, classifying images, translating speech to text and/or to other languages, facial or other biometric recognition, natural language processing ("NLP"), automated language translation, query processing in search engines, automatic content selection, analyzing email and other electronic documents, relationship management, biomedical informatics, identifying candidate biomolecules, providing recommendations, or other classification and AI tasks.

The processing for the applications described above may take place on individual devices such as personal computers or cell phones, but it might also be performed in datacenters. Hardware accelerators can also be used to accelerate ANN processing, including specialized ANN processing units, such as TPUs, FPGAs, and GPUs programmed to accelerate ANN processing. Such hardware devices can be deployed in consumer devices as well as in data centers due to their flexible nature and low power consumption per unit computation.

An ANN generally consists of a sequence of layers of different types (e.g. convolution, ReLU, fully connected, and pooling layers). As shown in FIG. 1, hyperparameters 122 can define the topology of an ANN. For instance, the hyperparameters 122 can include topology parameters that define the topology, or structure, of an ANN including, but not limited to, the number and type of layers, groupings of layers, connections between the layers, and the number of filters. The hyperparameters 122 can also define other aspects of the configuration and/or operation of an ANN.

Training 102 of ANNs typically utilizes a training data set 108. The training data set 108 includes samples (e.g. images) for applying to an ANN and data describing a desired output from the ANN for each respective sample in the training data set 108 (e.g. a set of images that have been labeled with data describing the actual content in the images).

ANNs are typically trained across multiple "epochs." In each epoch, an ANN training module 106, or another component, trains an ANN over the training data in a training data set 108 in multiple steps. In each step, the ANN first makes a prediction for an instance of the training data (which might also be referred to herein as a "sample"). This step is commonly referred to as a "forward pass" (which might also be referred to herein as a "forward training pass").

To make a prediction, a training data sample is fed to the first layer of the ANN, which is commonly referred to as an "input layer." Each layer of the ANN then computes a function over its inputs, often using learned parameters, or "weights 110" to produce an output (commonly referred to as an "activation"), which is used as an input for the next layer. The output of the last layer, commonly referred to as the "output layer," is a class prediction, commonly implemented as a vector indicating the probabilities that the sample is a member of a number of classes. Based on the label predicted by the ANN and the label associated with each instance of training data in the training data set 108, the output layer computes a "loss," or error function.

In a "backward pass" (which might also be referred to herein as a "backward training pass") of the ANN, each layer of the ANN computes the error for the previous layer and the gradients, or updates, to the weights 110 of the layer that move the ANN's prediction toward the desired output. The result of training an ANN is a set of weights 110 that represent a transform function that can be applied to an input with the result being a prediction 116. A modelling framework such as those described below can be used to train an ANN in this manner.

After an ANN model has been trained, a component of a modelling framework (e.g. the ANN inference module 112 shown in FIG. 1) can be used during inference 104 to make a prediction 116 regarding the classification of samples in an input data set 114 that are applied to the trained ANN. Specifically, the topology of an ANN is configured using the hyperparameters 112 that were used during training 102. The ANN then uses the weights 110 (and biases) obtained during training 102 to perform classification, recognition, or other types of tasks on samples in an input data set 114, typically samples that were not used during training. Such a modelling framework can use general purpose CPUs, special purpose processors (e.g. GPUs, TPUs, or FPGAs), and other types of hardware to execute an ANN and generate predictions 116 in this way.

In some examples, proprietary or open source libraries or frameworks are utilized to facilitate ANN creation, training 102, evaluation, and inference 104. Examples of such libraries include, but are not limited to, TENSORFLOW, MICROSOFT COGNITIVE TOOLKIT ("CNTK"), CAFFE, THEANO, and KERAS. In some examples, programming tools such as integrated development environments ("IDEs") provide support for programmers and users to define, compile, and evaluate ANNs.

Tools such as those identified above can be used to define, train, and use ANNs. As one example, a modelling framework can include pre-defined application programming interfaces ("APIs") and/or programming primitives that can be used to specify one or more aspects of an ANN, such as the hyperparameters 122. These pre-defined APIs can include both lower-level APIs (e.g., activation functions, cost or error functions, nodes, edges, and tensors) and higher-level APIs (e.g., layers, convolutional NNs, recurrent NNs, linear classifiers, and so forth).

"Source code" can be used as an input to such a modelling framework to define a topology of the graph of a given ANN. In particular, APIs of a modelling framework can be instantiated and interconnected using source code to specify a complex ANN model. Different ANN models can be defined by using different APIs, different numbers of APIs, and interconnecting the APIs in different ways. ANNs can be defined, trained, and implemented using other types of tools in other configurations.

Overview of Quantized Artificial Neural Networks

A typical floating-point representation in a computer system consists of three parts: a sign, a mantissa, and an exponent. The sign indicates if the number is positive or negative. The mantissa determines the precision to which numbers can be represented. In particular, the precision of the representation is determined by the precision of the mantissa. Common floating-point representations use a mantissa of 10 (float 16), 24 (float 32), or 53 (float 64) bits in width. The exponent modifies the magnitude of the mantissa.

Traditionally, ANNs have been trained and deployed using normal-precision floating-point format (e.g. 32-bit floating-point or "float 32" format) numbers. As used herein, the term "normal-precision floating-point" refers to a floating-point number format having a sign, mantissa, and a per-number exponent. Examples of normal-precision floating-point formats include, but are not limited to, IEEE 754 standard formats, such as 16-bit, 32-bit, or 64-bit formats.

Performance, energy usage, and storage requirements of ANNs can be improved through the use of quantized-precision floating-point formats during training and/or inference. In particular, weights 110 and activation values 208 (shown in FIGS. 2A and 2B, respectively) can be represented in a lower-precision quantized-precision floating-point format, which typically results in some amount of error being introduced. Examples of quantized-precision floating-point formats include formats having a reduced bit width (including by reducing the number of bits used to represent a number's mantissa or exponent) and block floating-point ("BFP") formats that use a small (e.g. 3, 4, or 5-bit) mantissa and an exponent shared by two or more numbers.

As shown in FIG. 1, quantization 118 can be utilized during both training 102 and inference 104. In particular, weights 110 and activation values generated by an ANN can be quantized through conversion from a normal-precision floating-point format (e.g. 16-bit or 32-bit floating point numbers) to a quantized-precision floating-point format. On certain types of hardware, such as FPGAs, the utilization of quantized-precision floating-point formats can greatly improve the latency and throughput of ANN processing.

As used herein, the term "quantized-precision floating-point" refers to a floating-point number format where two or more values of a floating-point number have been modified to have a lower precision than when the values are represented in normal-precision floating-point. In particular, some examples of quantized-precision floating-point representations include BFP formats, where two or more floating-point numbers are represented with reference to a common exponent.

A BFP format number can be generated by selecting a common exponent for two, more, or all floating-point numbers in a set and shifting mantissas of individual elements to match the shared, common exponent. Accordingly, for purposes of the present disclosure, the term "BFP" means a number system in which a single exponent is shared across two or more values, each of which is represented by a sign and mantissa pair (whether there is an explicit sign bit, or the mantissa itself is signed).

Thus, and as illustrated in FIGS. 2A and 2B, sets of floating-point numbers can be represented using a BFP floating-point format by a single shared exponent value, while each number in the set of numbers includes a sign and a mantissa. For example, and as illustrated in FIG. 2A, the weights 110A-110C generated by an ANN can each include a per-weight sign 202A-202C and a per-weight mantissa 204A-204C, respectively. However, the weights 110A-110C share a common exponent 206A. Similarly, and as shown in FIG. 2B, the activation values 208A-208C generated by an ANN can each include a per-activation value sign 202D-202F and a per-activation value mantissa 204D-204F, respectively. The activation values 208A-208C, however, share a common exponent 206B. In some examples, the shared exponent 206 for a set of BFP numbers is chosen to be the largest exponent of the original floating-point values.

Use of a BFP format, such as that illustrated in FIGS. 2A and 2B, can reduce computational resources required for certain common ANN operations. For example, for numbers represented in a normal-precision floating-point format, a floating-point addition is required to perform a dot product operation. In a dot product of floating-point vectors, summation is performed in floating-point, which can require shifts to align values with different exponents. On the other hand, for a dot product operation using BFP format floating-point numbers, the product can be calculated using integer arithmetic to combine mantissa elements. As a result, a large dynamic range for a set of numbers can be maintained with the shared exponent while reducing computational costs by using more integer arithmetic, instead of floating-point arithmetic.

BFP format floating-point numbers can be utilized to perform training operations for layers of an ANN, including forward propagation and back propagation. The values for one or more of the ANN layers can be expressed in a quantized format that has lower precision than normal-precision floating-point formats. For example, BFP formats can be used to accelerate computations performed in training and inference operations using a neural network accelerator, such as an FPGA.

Further, portions of ANN training, such as temporary storage of activation values 208, can be improved by compressing a portion of these values (e.g., for an input, hidden, or output layer of a neural network) from normal-precision floating-point to a lower-precision number format, such as BFP. The activation values 208 can be later retrieved for use during, for example, back propagation during the training phase.

As discussed above, performance, energy usage, and storage requirements of ANNs can be improved through the use of quantized-precision floating-point formats during training and/or inference. Learning optimal parameters for quantizing weights and activation values can, however, take a long time and consume significant computing resources. The technologies disclosed herein address these and potentially other considerations.

Differential Bit Width Neural Architecture Search

Figure 3:
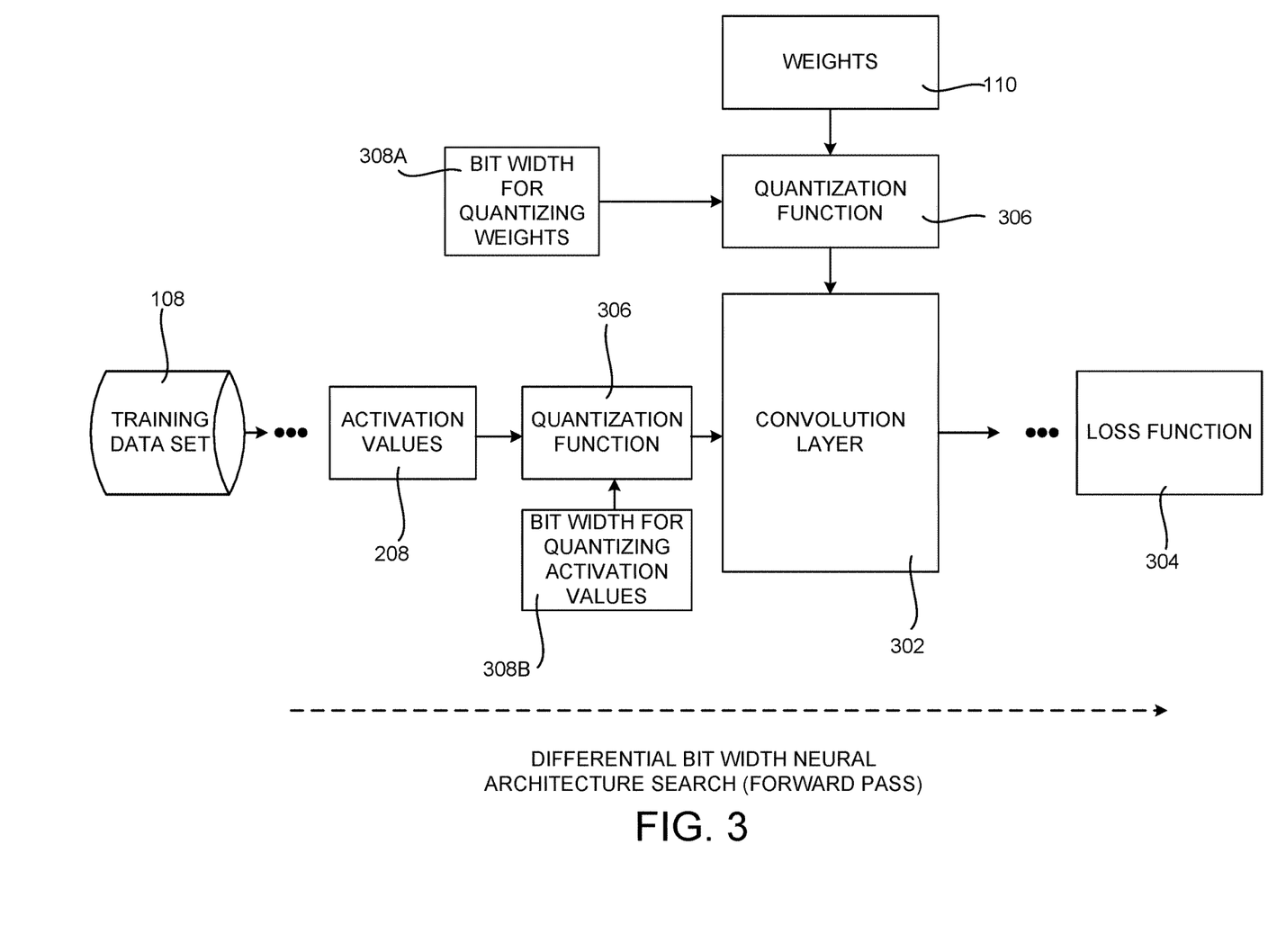
FIG. 3 is a neural network architecture diagram that illustrates aspects of a forward training pass when using differential bit width neural architecture search, with reference to a simplified topology of an example ANN.

FIG. 3 is a neural network architecture diagram that illustrates aspects of a forward training pass when using differential bit width neural architecture search, with reference to a simplified topology of an example ANN. As mentioned above, through implementations of the disclosed technologies, the accuracy and/or inference time of ANNs that utilize quantized-precision floating-point formats can be improved by learning optimal bit widths for use in quantizing weights and activation values at inference time. Additionally, the bit widths can be learned using an ANN, such as the example ANN shown in FIG. 3, thereby reducing learning time as compared to previous network architecture search methods that use RNNs and reinforcement learning. Reducing the time required to learn bit widths for quantizing weights and activation values can conserve computing resources such as, but not limited to, processor cycles, memory, network bandwidth, and power. Other technical benefits can be realized through implementations of the disclosed technologies.

In order to provide the technical benefits mentioned above, and potentially others, the disclosed technologies can learn optimized quantization parameters that define a quantization configuration for an ANN. Aspects of this process are illustrated in FIG. 3, which shows a forward training pass for a portion of an example ANN that includes a convolution layer 302.

In order to learn the bit widths to be used for quantization, the bit widths to be used for quantizing weights 110 and activation values are defined as trainable parameters when training an ANN such as that shown in FIG. 3. A quantizing function 306 can be utilized to quantize the weights 110 and activation values 208 for the convolution layer 302. The quantizing function 306 is differentiable with respect to bit width and receives as input a bit width 308A to be used when quantizing weights 110 and a bit width 308B to be used when quantizing activation values 208. As discussed above, the bit width 308A defines the bit width for storing the mantissa of the weights when represented using a quantized-precision floating-point format, such as BFP. Similarly, the bit width 308B defines a bit width for storing the mantissa of the activation values 208 when represented using a quantized-precision floating-point format.

During a forward training pass of a layer of an ANN such as that shown in FIG. 3, the quantizing function 306 can be executed to quantize the weights 110 for the layer of the ANN using according to the bit width 308A. The quantizing function 306 can also be executed during training to quantize activation values 208 for the layer of the ANN using the bit width 308B. The value of a loss function 304 can be computed at the end of each forward training pass of the ANN. A backward training pass of the ANN can then be performed, such as that shown in FIG. 4.

Figure 4:
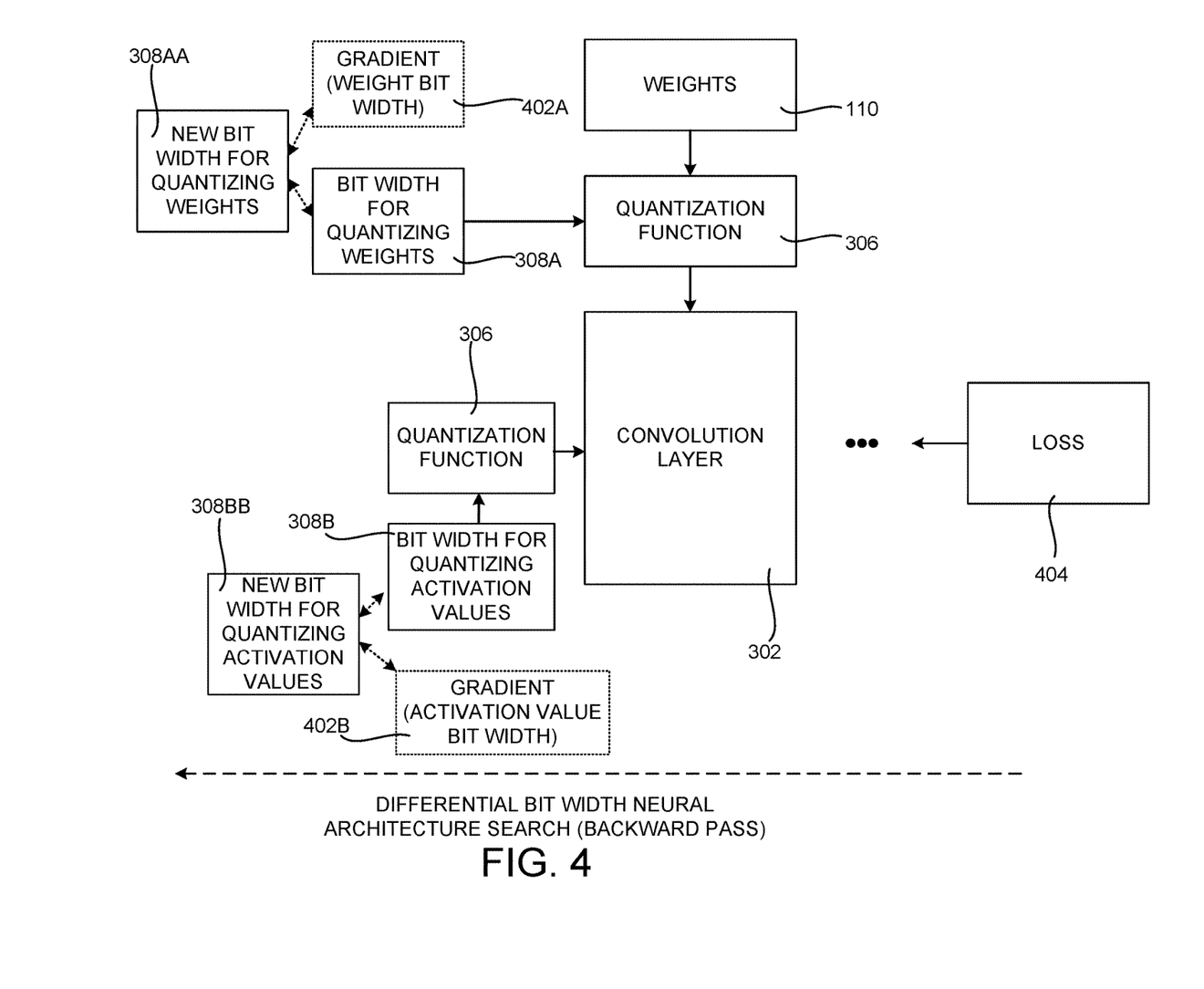
FIG. 4 is a neural network architecture diagram that illustrates aspects of a backward training pass when using differential bit width neural architecture search, with reference to the example ANN shown in FIG. 3.

FIG. 4 is a neural network architecture diagram that illustrates aspects of a backward training pass when using differential bit width neural architecture search, with reference to the simplified topology of the example ANN shown in FIG. 3. As shown in FIG. 4, the computed value 404 for the loss function 304 can be used during a backward training pass (i.e. backpropagation) to compute a gradient 402A for the bit width 308A used by the quantizing function 306 when quantizing weights 110. Similarly, the value 303 can be utilized to compute a gradient 402B for the bit width 308B used to quantize activation values 208.

Once the gradients 402A and 402B have been computed, new values for the first bit width and the second bit width can then be computed based upon the respective gradients. These are illustrated in FIG. 4 as the new bit width 308AA for quantizing weights and the new bit width 308BB for quantizing activation values.

In some configurations, the quantizing function 306 applies a floor function to round the new first bit width 308AA and the new second bit width 308BB down to an integer value and/or applies a weight decay to the new first bit width 308AA and the new second bit width 308BB. This training process can continue until training of the ANN is completed optimal bit widths for quantizing weights 110 and activation values 208 have been identified. In some configurations, weight decay is applied to the bit width parameters to guide the search process into regions of lower bit width.

In some configurations, the bit widths for quantizing weights 110 and activation values 208 are learned after the weights 110 for the ANN themselves have already been learned, which can also speed up learning of the bit widths. In other configurations, the bit widths for quantizing weights 110 and activation values 208 are learned at the same time as the weights 110 for the ANN are being learned.

Following the process described above, the learned bit widths can be utilized to create and implement a quantized ANN. For example, and without limitation, the learned bit widths can be utilized at inference time to quantize weights 110 and activation values 208 of the ANN.

Figure 5:
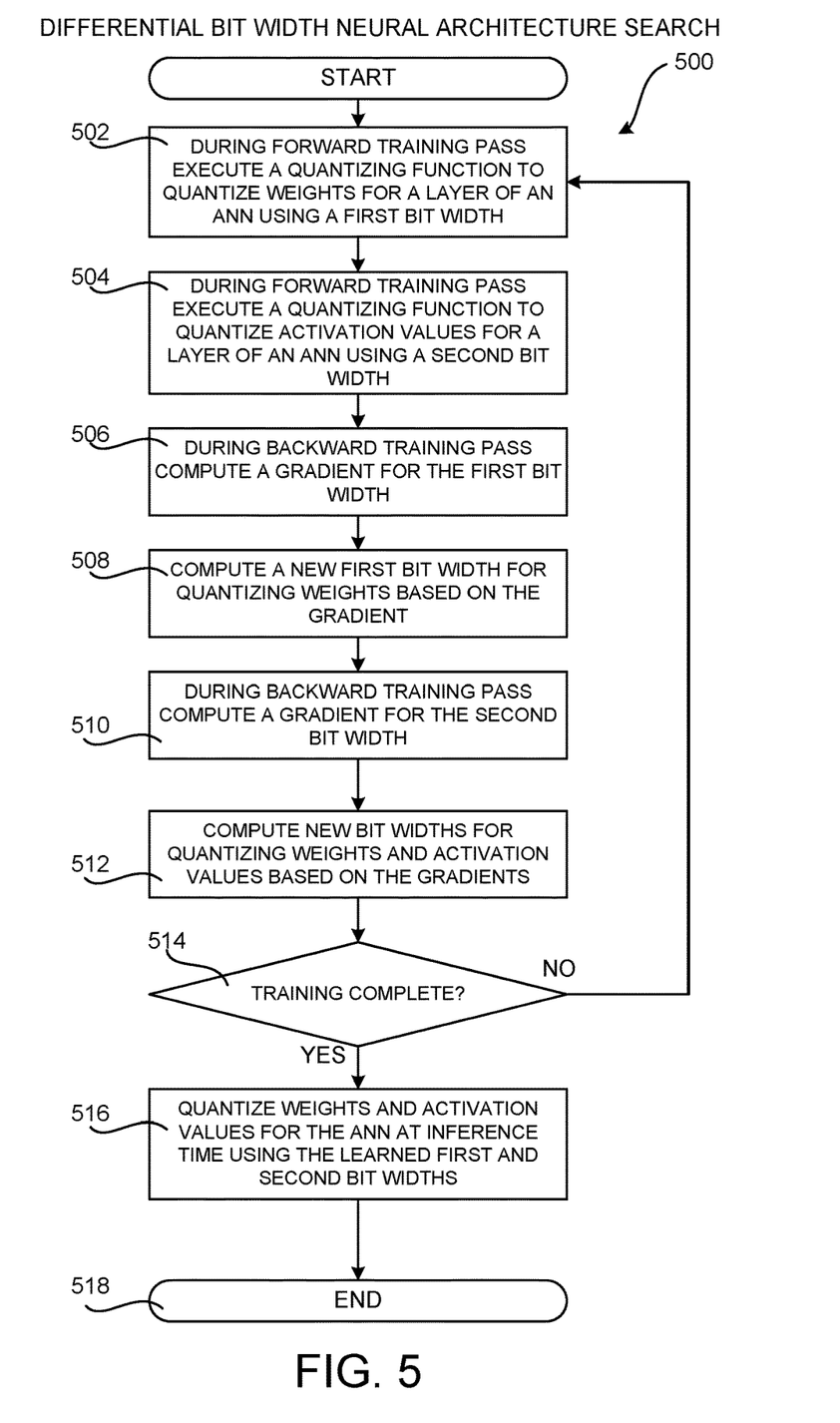
FIG. 5 is a flow diagram showing a routine that illustrates aspects of an illustrative computer-implemented process for differential bit width neural architecture search, according to one embodiment disclosed herein.

FIG. 5 is a flow diagram showing a routine 500 that illustrates aspects of a routine 500 for differential bit width neural architecture search, according to one embodiment disclosed herein. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 500 begins at operation 502, where, during a forward training pass of an ANN, a quantizing function 306 quantizes weights 110 for a layer of an ANN using a first bit width 308A. The routine 500 then proceeds from operation 502 to operation 504, where, during the forward training pass of the ANN, the quantizing function 306 quantizes activation values 208 using a second bit width 308B. The routine 500 then proceeds from operation 504 to operation 506.

At operation 506, where the ANN training module 106 computes a gradient 402A for the first bit width 308A during a backward training pass of the ANN. Similarly, at operation 506, the ANN training module computes a gradient 402B for the second bit width 308B during the backward training pass. The routine 500 then proceeds from operation 510 to operation 512, where the ANN training module 106 computes new bit widths 402AA and 402BB based upon the gradients 308A and 308B, respectively. The routine 500 then proceeds from operation 512 to operation 514.

At operation 514, the ANN training module 106 determines whether training is complete. If not, the routine 500 proceeds back to operation 502, where the process described above can be repeated until optimal bit widths for quantizing weights 110 and activation values 208 are learned. If training is complete, the routine 500 proceeds from operation 514 to operation 516, where the ANN inference module 112 can quantize weights 110 and activation values 208 at inference time using the learned bit widths. The routine 500 then proceeds from operation 516 to operation 518, where it ends.

Figure 6:
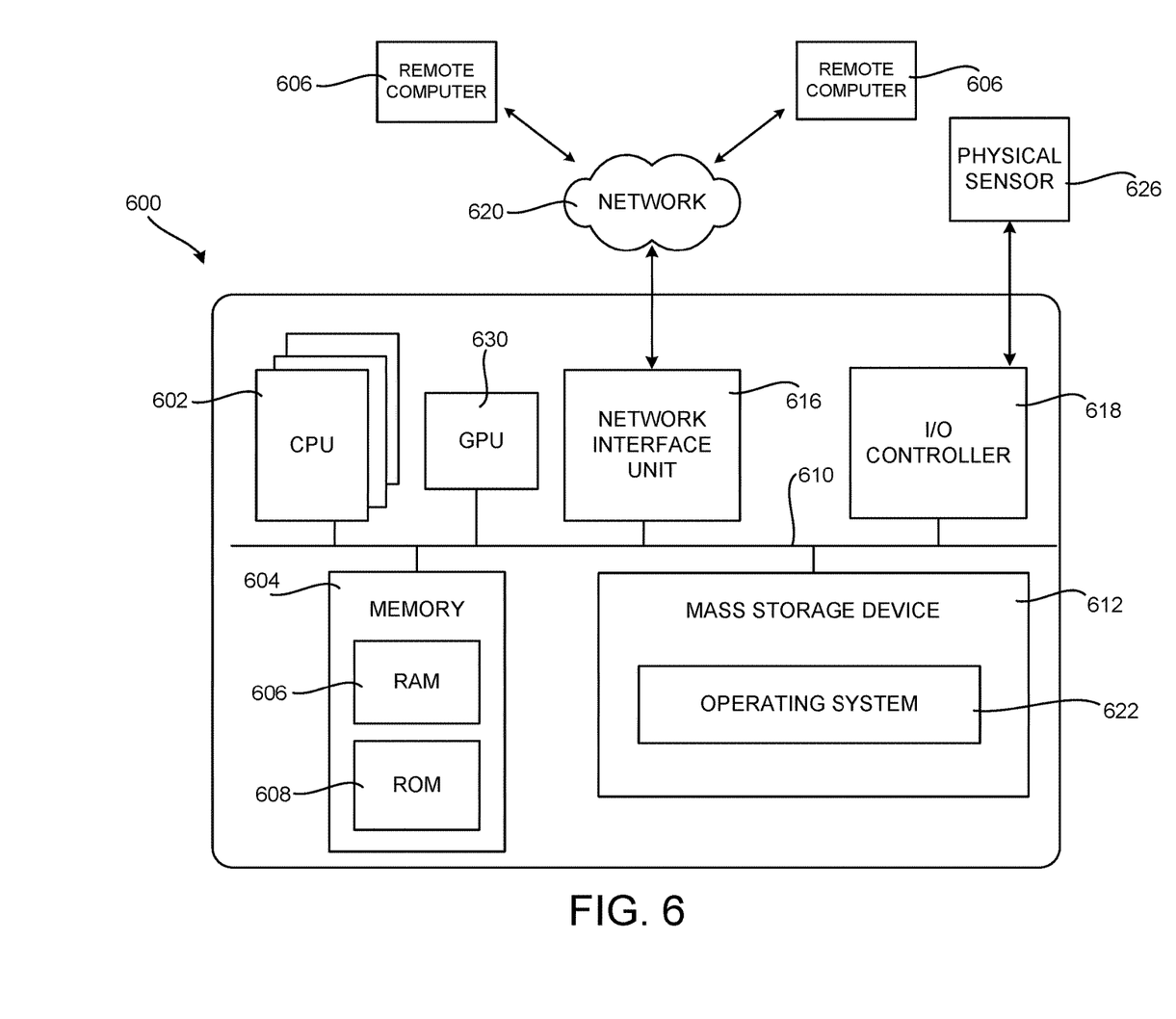
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a server computer, mobile phone, an e-reader, a smartphone, a desktop computer, an alternate reality or virtual reality ("AR/VR") device, a tablet computer, a laptop computer, or another type of computing device.

While the subject matter described herein is presented in the general context of server computers performing training of an ANN, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

The computer 600 illustrated in FIG. 6 includes one or more central processing units 602 ("CPU"), one or more GPUs 630, a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 622, application programs, and other types of programs. The mass storage device 612 can also be configured to store other types of programs and data.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. The computer 600 can connect to the network 620 through a network interface unit 616 connected to the bus 610. It should be appreciated that the network interface unit 616 can also be utilized to connect to other types of networks and remote computer systems. The computer 600 can also include an input/output controller 618 for receiving and processing input from a number of other devices, including a keyboard, mouse, touch input, an electronic stylus (not shown in FIG. 6), or a physical sensor such as a video camera. Similarly, the input/output controller 618 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer storage media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art.

It is also contemplated that the computer 600 might not include all of the components shown in FIG. 6, can include other components that are not explicitly shown in FIG. 6, or can utilize an architecture completely different than that shown in FIG. 6.

Figure 7:
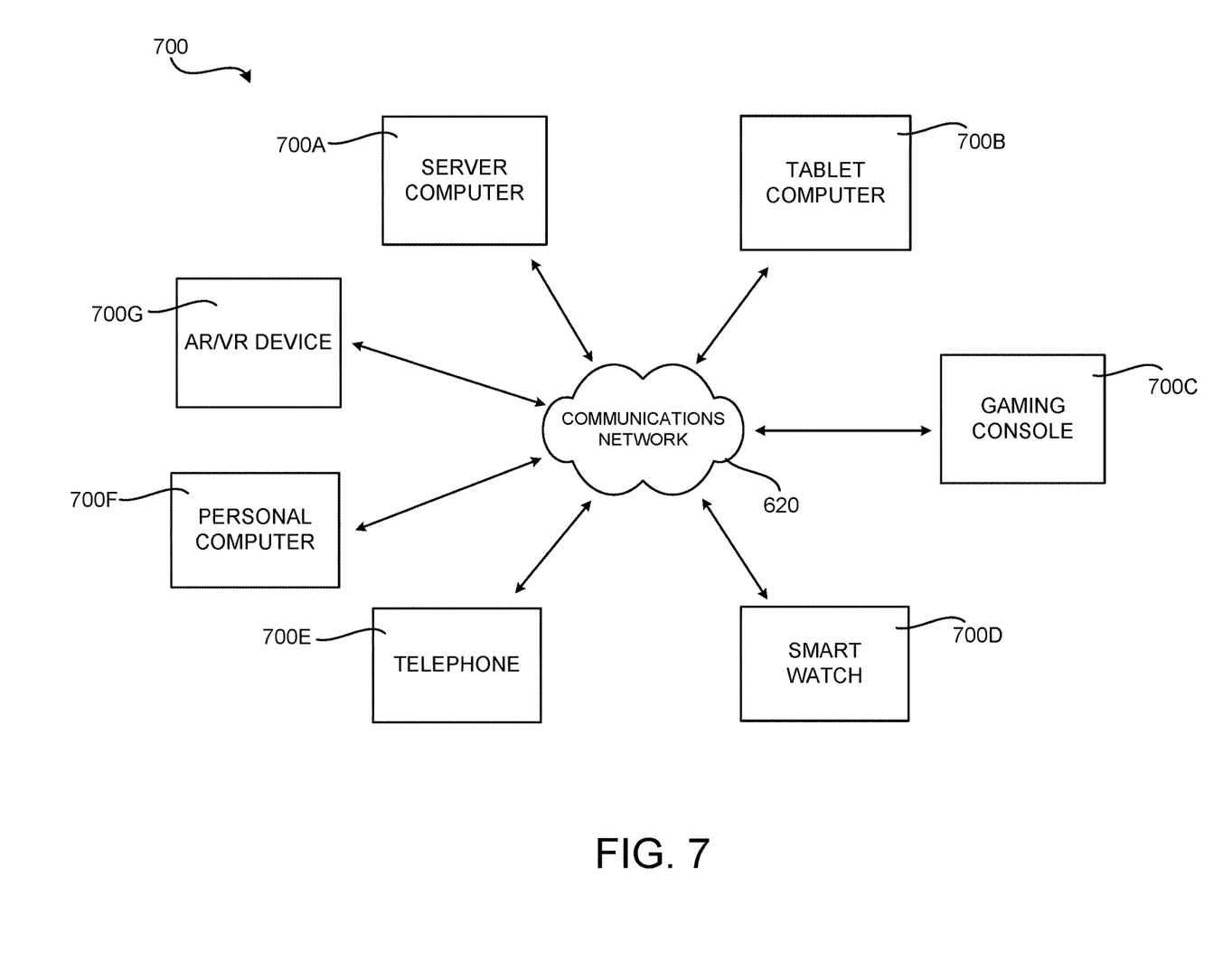
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various configurations presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the client computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the client computing devices 700B-700G can be equipped with an operating system operable to support one or more computing applications or terminal sessions such as a web browser (not shown in FIG. 7), other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a client computing device 700B-700G to obtain desired data and/or perform other computing applications.

The data and/or computing applications may be stored on the server 700A, or servers 700A, and communicated to cooperating users through the client computing devices 700B-700G over an exemplary communications network 620. A participating user (not shown in FIG. 7) may request access to specific data and applications housed in whole or in part on the server computer 700A. This data may be communicated between the client computing devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage ("NAS") and storage area networks ("SAN") to realize application/data transactions.

It should be appreciated that the computing architecture shown in FIG. 7 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following examples:

Example 1: A computer-implemented method, comprising: during a forward training pass of an artificial neural network (ANN), executing a quantizing function to quantize weights for a layer of the ANN using a first bit width, and executing the quantizing function to quantize activation values input to the layer of the ANN using a second bit width; during a backward training pass of the ANN, computing a gradient for the first bit width and a gradient for the second bit width, computing a new first bit width for quantizing the weights for the layer of the ANN based on the first gradient, and computing a new second bit width for quantizing the activation values input to the layer of the ANN based on the second gradient; and quantizing weights and activation values for the ANN at inference time using the new first bit width and the new second bit width.

Example 2: The computer-implemented method of Example 1, wherein the weights are learned prior to the forward training pass.

Example 3: The computer-implemented method of Examples 1 and 2, wherein the weights are learned during the forward training pass.

Example 4: The computer-implemented method of Examples 1-3, wherein the first bit width defines a bit width for a mantissa for storing the weights.

Example 5: The computer-implemented method of Examples 1-4, wherein the second bit width defines a bit width for a mantissa for storing the activation values.

Example 6: The computer-implemented method of Examples 1-5, wherein the bit width for the mantissa for storing the weights and the bit width for the mantissa for storing the activation values comprise fewer bits than a mantissa in a normal-precision floating-point representation.

Example 7: The computer-implemented method of Examples 1-6, wherein the quantizing function applies a floor function to round the new first bit width and the new second bit width down to an integer value.

Example 8: The computer-implemented method of Examples 1-7, wherein the quantizing function applies a weight decay to the new first bit width and the new second bit width.

Example 9: A computing device, comprising: one or more processors; and at least one computer storage media having computer-executable instructions stored thereupon which, when executed by the one or more processors, will cause the computing device to: during a forward training pass of an artificial neural network (ANN), execute a quantizing function to quantize weights for a layer of the ANN using a first bit width, and execute the quantizing function to quantize activation values input to the layer of the ANN using a second bit width; during a backward training pass of the ANN, compute a gradient for the first bit width and a gradient for the second bit width, compute a new first bit width for quantizing the weights for the layer of the ANN based on the first gradient, and compute a new second bit width for quantizing the activation values input to the layer of the ANN based on the second gradient; and quantize weights and activation values for the ANN at inference time using the new first bit width and the new second bit width.

Example 10: The computing device of Example 9, wherein the first bit width defines a bit width for a mantissa for storing the weights and wherein the second bit width defines a bit width for a mantissa for storing the activation values.

Example 11: The computing device of Examples 9 and 10, wherein the bit width for the mantissa for storing the weights and the bit width for the mantissa for storing the activation values comprise fewer bits than a mantissa in a normal-precision floating-point representation.

Example 12: The computing device of Examples 9-11, wherein the weights are learned prior to the forward training pass.

Example 13: The computing device of Examples 9-12, wherein the weights are learned during the forward training pass.

Example 14: The computing device of Examples 9-13, wherein the quantizing function applies a floor function to round the new first bit width and the new second bit width down to an integer value, and wherein the quantizing function applies a weight decay to the new first bit width and the new second bit width.

Example 15: A computer-implemented method, comprising: learning a first bit width for quantizing weights for a layer of an artificial neural network (ANN); learning a second bit width for quantizing activation values for a layer of the ANN; and quantizing weights and activation values for the ANN at inference time using the first bit width and the second bit width.

Example 16: The computer-implemented method of Example 15, wherein learning the first bit width and the second bit width comprises: during a forward training pass of the ANN, execute a quantizing function to quantize the weights for the layer of the ANN using the first bit width, and execute the quantizing function to quantize the activation values for the layer of the ANN using the second bit width; and during a backward training pass of the ANN, compute a gradient for the first bit width and a gradient for the second bit width, compute a new first bit width for quantizing the weights for the layer of the ANN based on the first gradient, and compute a new second bit width for quantizing the activation values input to the layer of the ANN based on the second gradient.

Example 17: The computer-implemented method of Examples 15 and 16, wherein the first bit width defines a bit width for a mantissa for storing the weights and wherein the second bit width defines a bit width for a mantissa for storing the activation values.

Example 18: The computer-implemented method of Examples 15-17, wherein the bit width for the mantissa for storing the weights and the bit width for the mantissa for storing the activation values comprise fewer bits than a mantissa in a normal-precision floating-point representation.

Example 19: The computer-implemented method of Examples 15-18, wherein the weights are learned prior to the forward training pass.

Example 20: The computer-implemented method of Examples 15-19, wherein the weights are learned during the forward training pass.

Based on the foregoing, it should be appreciated that technologies for differential bit width neural architecture search have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
during a forward training pass of an artificial neural network (ANN),
executing a quantizing function to quantize a mantissa of weights for a layer of the ANN using a first bit width, the first bit width defining a bit width for storing the mantissa of the weights in a quantized-precision floating-point format, and
executing the quantizing function to quantize a mantissa of activation values input to the layer of the ANN using a second bit width, the second bit width defining a bit width for storing the mantissa of the activation values in the quantized-precision floating-point format;
during a backward training pass of the ANN,
computing a first gradient for the first bit width,
computing a second gradient for the second bit width,
computing a new first bit width for quantizing the mantissa of the weights for the layer of the ANN based on the first gradient, and
computing a new second bit width for quantizing the mantissa of the activation values input to the layer of the ANN based on the second gradient; and
during inference,
quantizing mantissas of weights for the ANN using the new first bit width, and
quantizing mantissas of activation values for the ANN using the new second bit width.

2. The computer-implemented method of claim 1, wherein the weights are learned prior to the forward training pass.

3. The computer-implemented method of claim 1, wherein the weights are learned during the forward training pass.

4. The computer-implemented method of claim 1, wherein the first bit width for the mantissa for storing the weights and the second bit width for the mantissa for storing the activation values comprise fewer bits than a mantissa in a normal-precision floating-point representation.

5. The computer-implemented method of claim 1, wherein the quantizing function applies a floor function to round the new first bit width and the new second bit width down to an integer value.

6. The computer-implemented method of claim 1, wherein the quantizing function applies a weight decay to the new first bit width and the new second bit width.

7. A computing device, comprising:
one or more processors; and
at least one computer storage media having computer-executable instructions stored thereupon which, when executed by the one or more processors, will cause the computing device to:
during a forward training pass of an artificial neural network (ANN),
execute a quantizing function to quantize a mantissa of weights for a layer of the ANN using a first bit width, the first bit width defining a bit width for storing the mantissa of the weights in a quantized-precision floating-point format, and
execute the quantizing function to quantize a mantissa of activation values input to the layer of the ANN using a second bit width, the second bit width defining a bit width for storing the mantissa of the activation values in the quantized-precision floating-point format;
during a backward training pass of the ANN,
compute a first gradient for the first bit width,
compute a second gradient for the second bit width,
compute a new first bit width for quantizing the mantissa of the weights for the layer of the ANN based on the first gradient, and
compute a new second bit width for quantizing the mantissa of the activation values input to the layer of the ANN based on the second gradient; and
during inference,
quantize mantissas of weights for the ANN using the new first bit width, and
quantize mantissas of activation values for the ANN using the new second bit width.

8. The computing device of claim 7, wherein the first bit width for the mantissa for storing the weights and the second bit width for the mantissa for storing the activation values comprise fewer bits than a mantissa in a normal-precision floating-point representation.

9. The computing device of claim 7, wherein the weights are learned prior to the forward training pass.

10. The computing device of claim 7, wherein the weights are learned during the forward training pass.

11. The computing device of claim 7, wherein the quantizing function applies a floor function to round the new first bit width and the new second bit width down to an integer value, and wherein the quantizing function applies a weight decay to the new first bit width and the new second bit width.

12. A computer storage media having computer-executable instructions stored thereupon which, when executed by one or more processors, will cause a computing device to:
during a forward training pass of an artificial neural network (ANN),
execute a quantizing function to quantize a mantissa of weights for a layer of the ANN using a first bit width, the first bit width defining a bit width for storing the mantissa of the weights in a quantized-precision floating-point format, and
execute the quantizing function to quantize a mantissa of activation values input to the layer of the ANN using a second bit width, the second bit width defining a bit width for storing the mantissa of the activation values in the quantized-precision floating-point format;
during a backward training pass of the ANN,
compute a first gradient for the first bit width,
compute a second gradient for the second bit width,
compute a new first bit width for quantizing the mantissa of the weights for the layer of the ANN based on the first gradient, and
compute a new second bit width for quantizing the mantissa of the activation values input to the layer of the ANN based on the second gradient; and
during inference,
quantize mantissas of weights for the ANN using the new first bit width, and
quantize mantissas of activation values for the ANN using the new second bit width.

13. The computer storage media of claim 12, wherein the bit width for the mantissa for storing the weights and the bit width for the mantissa for storing the activation values comprise fewer bits than a mantissa in a normal-precision floating-point representation.

14. The computer storage media of claim 12, wherein the weights are learned prior to the forward training pass.

15. The computer storage media of claim 12, wherein the weights are learned during the forward training pass.

* * * * *